(12) United States Patent
Alford

(10) Patent No.: US 9,441,330 B2
(45) Date of Patent: Sep. 13, 2016

(54) DEVICE FOR GENERATING VERTICAL FORCE WITH ROTATING MASS

(71) Applicant: HARSCO CORPORATION, Camp Hill, PA (US)

(72) Inventor: Robert Alford, West Columbia, SC (US)

(73) Assignee: Harsco Corporation, Camp Hill, PA (US)

( * ) Notice: Subject to any disclaimer, the term of this patent is extended or adjusted under 35 U.S.C. 154(b) by 296 days.

(21) Appl. No.: 14/185,733

(22) Filed: Feb. 20, 2014

(65) Prior Publication Data

US 2014/0238164 A1 Aug. 28, 2014

Related U.S. Application Data

(60) Provisional application No. 61/768,850, filed on Feb. 25, 2013.

(51) Int. Cl.

| E01B 27/12 | (2006.01) |
|---|---|
| E01B 27/16 | (2006.01) |
| E01B 27/20 | (2006.01) |
| F16H 25/08 | (2006.01) |
| F16H 33/20 | (2006.01) |
| E01B 37/00 | (2006.01) |

(52) U.S. Cl.
CPC .............. *E01B 27/12* (2013.01); *E01B 27/16* (2013.01); *E01B 27/20* (2013.01); *E01B 37/00* (2013.01); *F16H 25/08* (2013.01); *F16H 33/20* (2013.01); *Y10T 74/18296* (2015.01)

(58) Field of Classification Search
CPC ........ E01B 27/12; E01B 27/16; E01B 27/17; F16H 25/08
See application file for complete search history.

(56) References Cited

U.S. PATENT DOCUMENTS

| 3,589,298 | A | | 6/1971 | Plasser et al. |
|---|---|---|---|---|
| 3,919,943 | A | | 11/1975 | Plasser et al. |
| 4,046,079 | A | * | 9/1977 | Theurer ................ E01B 27/13 104/12 |
| 4,111,129 | A | | 9/1978 | von Beckmann |
| 4,125,075 | A | | 11/1978 | Stewart |
| 4,927,289 | A | | 5/1990 | Artzberger |
| 5,419,259 | A | | 5/1995 | Theurer et al. |
| 5,617,794 | A | | 4/1997 | Theurer et al. |
| 6,021,717 | A | | 2/2000 | Theurer |
| 7,762,197 | B1 | * | 7/2010 | VanBergen .......... E01B 27/16 104/10 |
| 2012/0004795 | A1 | * | 1/2012 | Miller .................. E01B 27/00 701/19 |
| 2012/0174816 | A1 | | 7/2012 | Miller et al. |

FOREIGN PATENT DOCUMENTS

JP 2001-193004 A 7/2001

OTHER PUBLICATIONS

International Search Report and Written Opinion, PCT/US2014/017497, dated May 26, 2014, 11 pages.

* cited by examiner

*Primary Examiner* — Zachary Kuhfuss
(74) *Attorney, Agent, or Firm* — Baker & McKenzie LLP

(57) ABSTRACT

The present disclosure relates to a device for generating vertical force. The device includes a housing, at least one bearing sleeve mounted in the housing, and at least one mass sleeve mounted within the bearing sleeve. The mass sleeve includes first and second masses with the first mass being larger than the second mass and the first and second masses being positioned substantially 180 degrees relative to one another. Related methods are described.

22 Claims, 5 Drawing Sheets

DEVICE FOR GENERATING VERTICAL FORCE WITH ROTATING MASS

CROSS-REFERENCE TO RELATED APPLICATIONS

This application claims priority to U.S. Provisional App. Ser. No. 61/768,850, filed on Feb. 25, 2013, which is hereby incorporated by reference in its entirety.

BACKGROUND

Railroads are generally constructed of a pair of elongated, substantially parallel rails, which are coupled to a plurality of laterally extending ties via metal tie plates and spikes and/or spring clip fasteners. The rails and ties are disposed on a ballast bed formed of hard particulate material, such as gravel. In many instances, including upon initial installation, the ties may not be disposed tightly within the ballast bed.

Stabilizers have been used to stabilize railroad ties into the ballast bed, while also testing the integrity of the rails and ties. Conventional stabilizers rely on hydraulic cylinders positioned on a frame to generate downward force. The weight of the frame carrying such cylinders is generally more than the amount of force applied in the downward direction so that the frame will not lift off of the rail. This arrangement requires heavy, manned machinery, which adds to the inefficiency and cost of the stabilizing operation. Accordingly, improved devices and methods for generating desired downward force are desired that allow for lighter frames carrying such devices.

BRIEF SUMMARY

The present disclosure generally relates to a device for generating vertical force. The device according to the present disclosure may include a housing, a bearing sleeve mounted in the housing, and a mass sleeve mounted within the bearing sleeve. The mass sleeve has a pair of masses coupled thereto in which one of the masses is larger than the other mass and the masses are positioned opposite one another. In a preferred embodiment, the device for generating vertical force includes two pairs of mass sleeves. Related methods are described.

BRIEF DESCRIPTION OF THE DRAWINGS

Reference is now made to the following descriptions taken in conjunction with the accompanying drawings.

DETAILED DESCRIPTION

Various embodiments of a device for generating vertical force and methods of using such devices according to the present disclosure are described. It is to be understood, however, that the following explanation is merely exemplary in describing the devices and methods of the present disclosure. Accordingly, several modifications, changes and substitutions are contemplated.

Figure 1:
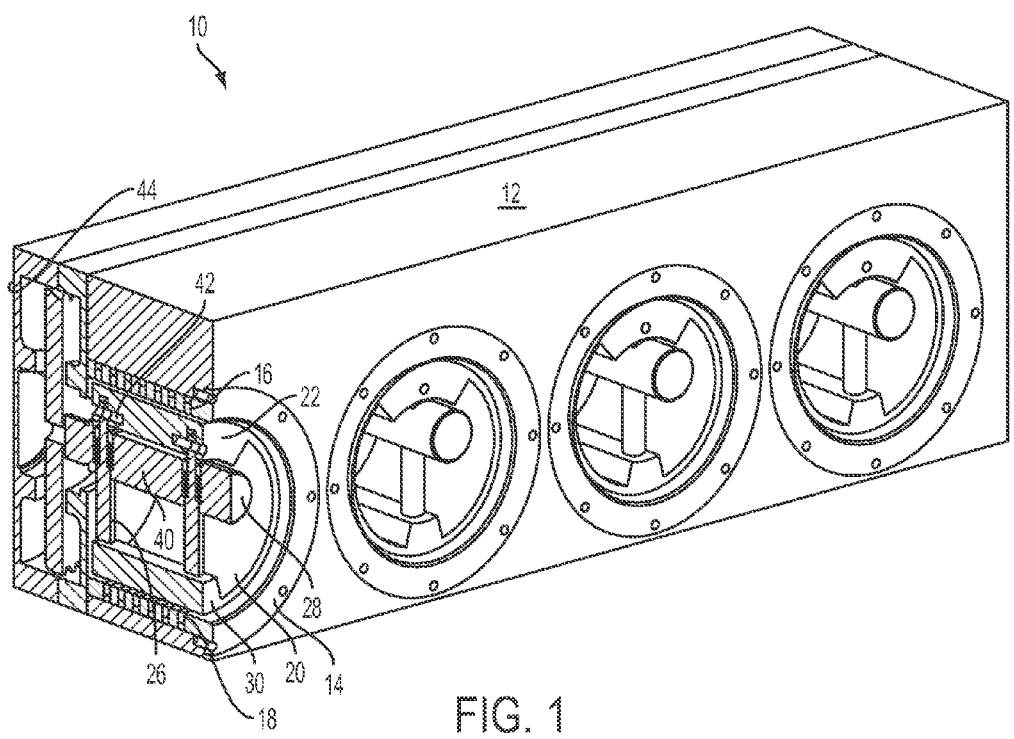
FIG. 1 illustrates a partial sectional, partial perspective view of a device for generating vertical force according to one embodiment of the present disclosure.
Figure 2:
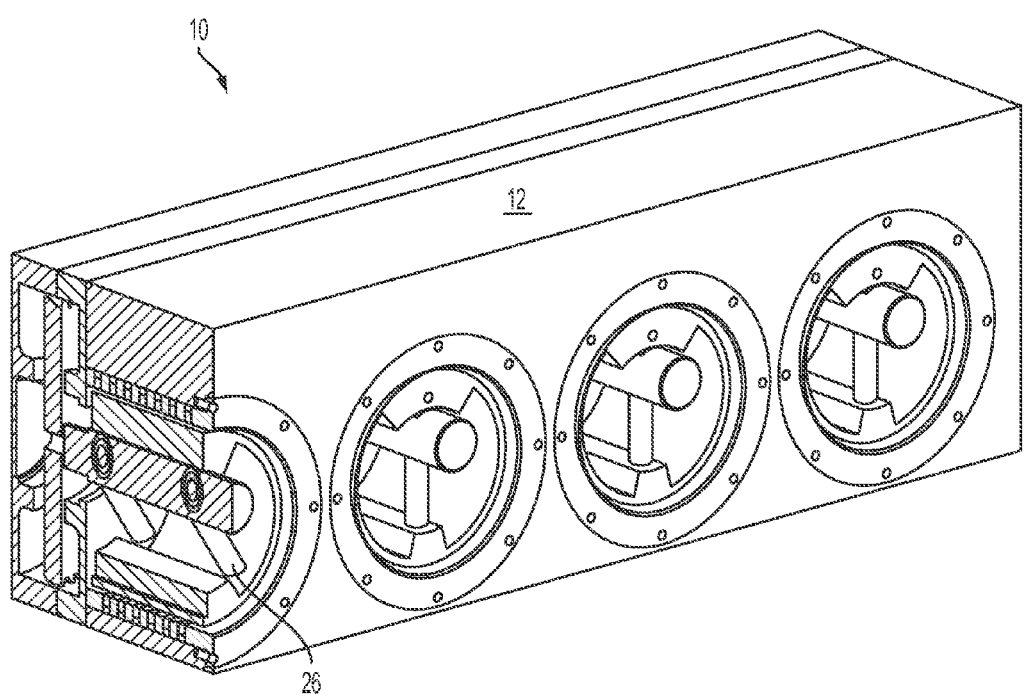
FIG. 2 illustrates a partial sectional, partial perspective view of the device of FIG. 1 with pivoted shafts.

A device for generating vertical force according to the present disclosure is depicted as reference numeral 10 in FIGS. 1-2. In some embodiments, the device 10 may be substantially rectangular in shape; however, it is to be appreciated that the device may take on a variety of configurations without departing from the principles of the present disclosure. The device for generating vertical force 10 generally includes a housing 12 having one or more bearing sleeves 14 disposed therein. In a preferred embodiment, four bearing sleeves 14 are provided. The bearing sleeves 14 may be bolted to the housing 12 such that it is fixed within the housing. Referring to the bearing sleeve 14 shown in section view, the bearing sleeve includes a plurality of slots 16 formed therein for receiving bearings 18 upon which an eccentric mass sleeve 20 rotates. That is, the mass sleeve 20 is disposed in a concentric manner within the bearing sleeve 14 and is adapted to rotate relative to the bearing sleeve via the bearings 18. A lubricant may be fed into the space between the bearing sleeve and the mass sleeve to ease frictional effects.

A first mass 22 is coupled to an inward-facing surface of the mass sleeve. Preferably, the first mass 22 is integrally formed with the mass sleeve 20, such as via a welding process. The first mass 22 may be formed to extend substantially along a longitudinal length of the mass sleeve 20 as shown in the sectional view of FIG. 1. The first mass 22 is further coupled to one or more shafts 26, which extend radially away from the first mass. In a preferred embodiment, two shafts 26 are coupled to the first mass. The mass shafts 26 are further coupled to a drive shaft 28, which drives rotation of the mass shafts, and therefore drives rotation of the first mass 22 and the mass sleeve 20 as will be described.

A second mass 30 is further coupled to the inward-facing surface of the mass sleeve 20 at a position substantially 180 degrees from the first mass. Similar to the first mass 22, the second mass 30 is coupled to the mass sleeve 20 and extends substantially along a longitudinal length of the mass sleeve. Preferably, the second mass 30 is integrally formed with the mass sleeve 20, such as via a welding process. In some embodiments, the second mass 30 is coupled to one or more shafts, such as shaft 26, while in other embodiments, the second mass is not coupled to any shaft. The second mass 30 is smaller in size relative to the first mass to act as a counterbalance to the force generated by rotation of the larger mass 22 as will be further described.

The shafts 26 coupled to the first mass 22 are movable within the drive shaft 28 via bushings 40 disposed between the drive shaft and the mass shafts. That is, the shafts 26 are adapted to translate through the drive shaft 28 during operation of the device 10 as will be described. The shafts 26 are further adapted to pivot at the coupling interface with the first mass 22. In a preferred embodiment, a pair of slots 42 are formed in the first mass to permit the shafts to pivot with respect to the first mass during rotation as shown in FIG. 2. Although not shown, it is to be appreciated that the additional bearing sleeves 14 and associated mass sleeves 20 are constructed in the same or similar manner to the exemplary bearing sleeve and mass sleeve shown in section.

A gear box 44 is disposed adjacent to the eccentric mass sleeves 20 of the device 10 and includes gears 46 and bearings (not shown) for driving the drive shafts 28, and therefore, each of the mass sleeves. The gears 46 of the gear box may be driven by a hydraulic motor or other power generation source. The gear box 44 maintains the desired rotation of the mass sleeves as is further described below.

In a preferred embodiment, four mass sleeves 20 are linearly arranged within the housing 12. Of course, other embodiments are contemplated in which fewer or more mass sleeves are used in accordance with the principles of the present disclosure. The housing 12 may be carried by a conventional or purpose-built rail vehicle. In some embodiments, the housing 12 may be carried by a drone vehicle not requiring an onboard human operator.

Figure 3:
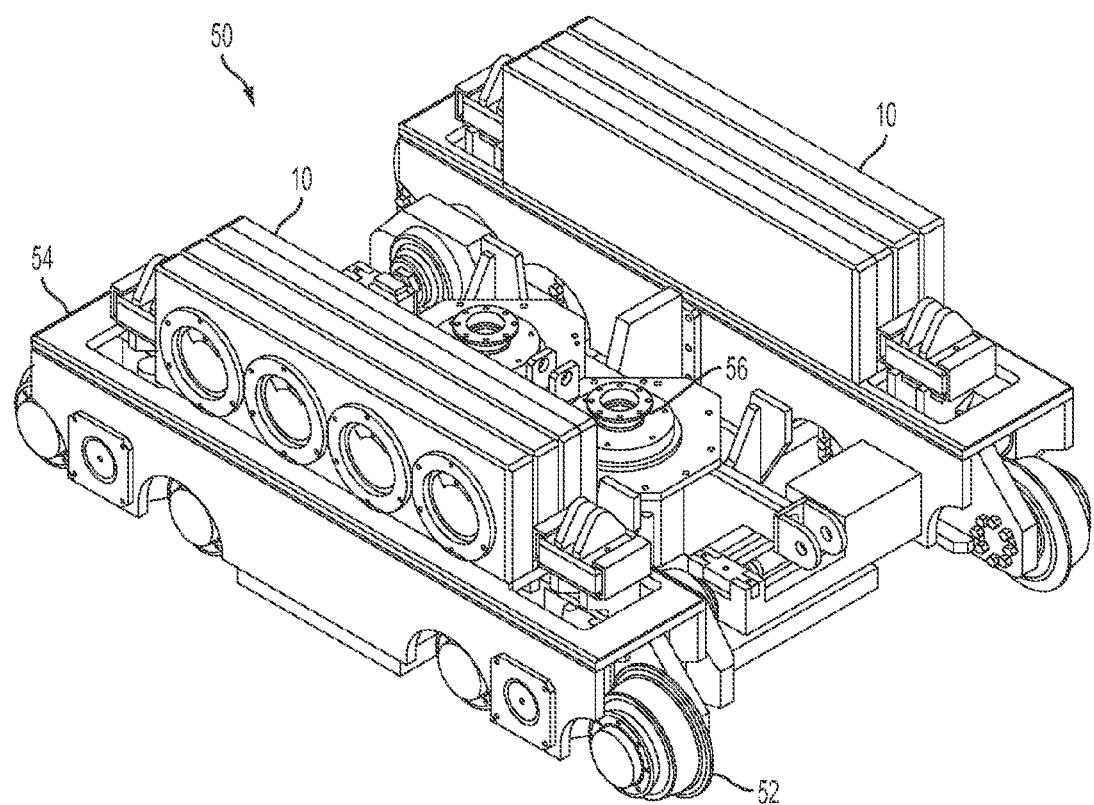
FIG. 3 illustrates a perspective view of a track stabilization unit according to one embodiment of the present disclosure.

Referring to FIG. 3, a track stabilization unit 50 is illustrated, which is configured to travel along rails and to permit operation of the device for generating vertical force 10. The track stabilization unit 50 is configured to carry the device 10 thereon. In a preferred embodiment, and as illustrated, the track stabilization unit 50 includes a pair of devices for generating vertical force 10 disposed on either side of the unit. The track stabilization unit 50 includes a plurality of rail wheels 52 operatively coupled to a frame 54, which carries the devices 10. In some embodiments, the frame 54 includes a pair of coupling elements 56, which are adapted to couple the track stabilization unit 50 to a rail vehicle.

Figure 4:
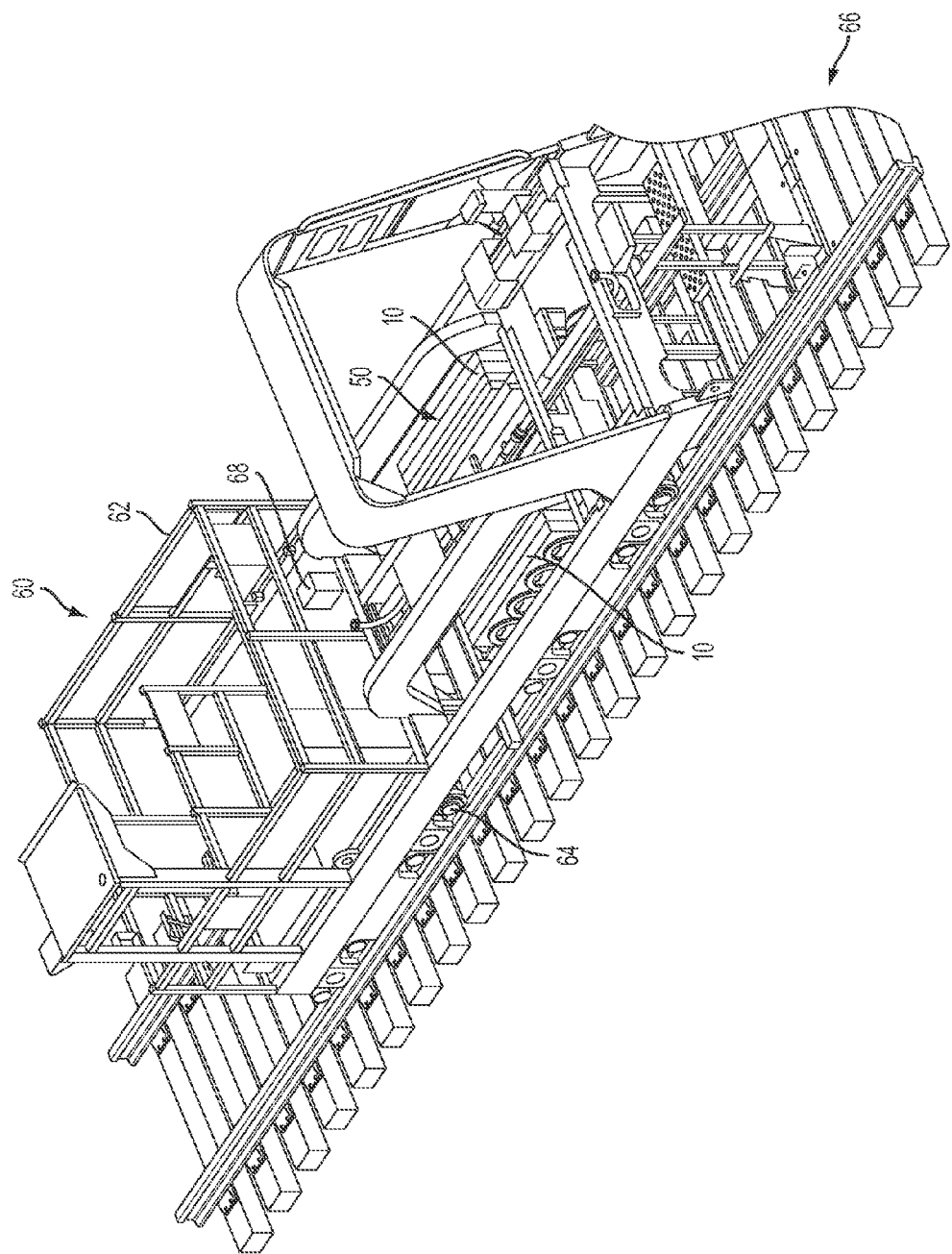
FIG. 4 illustrates a perspective view of the track stabilization unit of FIG. 3 coupled to a rail vehicle.

In some embodiments, the track stabilization unit 50 may operate independently or be towed by a rail vehicle. Referring to FIG. 4, the track stabilization unit 50 may be coupled to a rail vehicle 60, which may be a dedicated vehicle to track stabilization processes, or in some embodiments, it may be a multi-purpose vehicle that is configured to carry out various track maintenance operations, such as ballast tamping, spike pulling, spike driving, anchor spreading, anchor squeezing, tie extracting, or other maintenance operations. The rail vehicle 60 includes a frame 62 and a plurality of rail wheels 64 coupled to the vehicle frame. The rail vehicle 60 further includes a propulsion device (not shown), which is structured to propel the vehicle along a railroad track 66. In some embodiments, the rail vehicle 60 is an autonomous drone vehicle that is capable of operating with limited or no involvement from an operator.

Operation of the rail vehicle 60 as a drone vehicle may be carried out by a process that may be executed by a controller, a special purpose processor/computer or a general purpose processor programmed to execute the process. The drone operation may also be in the form of computer executable instructions that, when executed by a processor, cause the processor to execute the drone operation. The computer executable instructions may be stored on one or more computer readable mediums in whole or in parts. The instructions and/or the processor programmed to execute the process may be provided onboard the autonomous vehicle 60, such as in processing unit 68, or alternatively in a device external to the autonomous drone (for example, on an operator control interface or another piece of work equipment) that is in communication with the autonomous drone, or a combination thereof.

Figure 5:
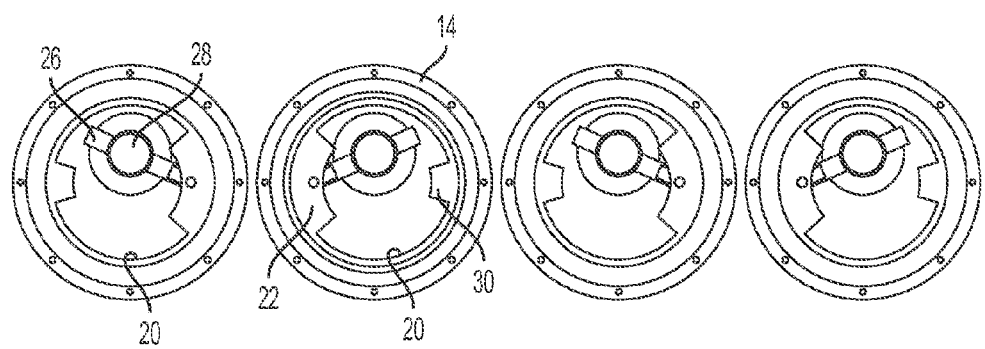
FIG. 5 illustrates a schematic front view of the mass sleeves of the device for generating vertical force with mass sleeves positioned for cancellation of lateral force.

In practice, the device for generating vertical force 10 is operated to rotate the mass sleeves to effect large force in the downward direction, while minimizing force in the upward direction. Upward forces are undesirable as such force may lift the housing off of the vehicle frame carrying the housing, thus presenting a safety hazard. Further, the vertical forces generated by the device 10 allow for lighter frames for carrying out stabilization processes as the vertical forces generated by the device essentially replace the heavier weight of conventional machinery. Referring to FIG. 5, adjacent mass sleeves 20 are rotated in opposite directions such that rotation of the mass sleeves, and therefore the first and second masses 22, 30, causes cancellation of lateral forces generated by rotation of the mass sleeves.

Figure 6:
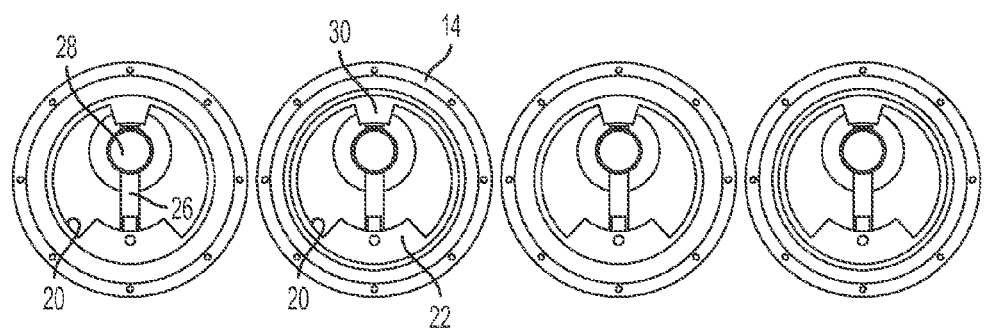
FIG. 6 illustrates a schematic front view of the mass sleeves of the device for generating vertical force with mass sleeves positioned for generation of downward force.

To increase downward force provided by the device 10, the drive shaft 28 may be positioned eccentric within the mass sleeve 20. That is, the centerline of the gear box (and thus the drive shaft 28) is offset from the centerline of the mass sleeve 20, and thus a ratio between the upward force and downward force generated by the device 10 may be defined. This ratio can be varied by increasing or decreasing the offset between the centerline of the gear box 44 (and the drive shaft 28) and the centerline of the mass sleeve 20. For example, the drive shaft 28 may be positioned closer to an upper portion of the bearing sleeve 14 such that the speed of rotation of the large mass 22 slows down as the large mass approaches and passes adjacent to the upper portion of the bearing sleeve. As the large mass 22 then rotates downward, the distance between the drive shaft 28 and the large mass lengthens (via movement of the mass shafts 26 through the drive shaft), thus causing the large mass to increase in speed of rotation as the large mass approaches a lower portion of the bearing sleeve. This generates desired downward force. As illustrated in FIG. 6, it is desired to rotate the mass sleeves 20 such that the large masses are in the downward position (i.e., at the lowest point relative to the fixed bearing sleeve 14 and the housing) at substantially the same time to thereby maximize the application of force in the downward direction.

When the large masses 22 are in the downward position, the smaller masses 30 are in the upward position (i.e., at the highest point relative to the fixed bearing sleeve 14 and the housing). However, the upward forces of the smaller masses 30 are reduced by eccentric positioning of the drive shaft 28, which causes the smaller masses to slow in rotational speed as they pass adjacent to the upper portion of the bearing sleeve. As the smaller masses rotate to a downward position, they gain rotational speed, thus increasing the amount of force generated by the smaller masses in the downward direction. Such force reduces the amount of upward force realized when the large masses are in the upward position.

The device for generating vertical force 10 may be utilized to assist in stabilizing the rails and underlying ties into the ballast bed through the application of force in the downward direction via rotation of the mass sleeves 20. In some embodiments, such application of force is continuous as the rail vehicle continuously moves along the rails. In other embodiments, the application of force may be selective and applied periodically along the rails.

While various embodiments in accordance with the disclosed principles have been described above, it should be understood that they have been presented by way of example only, and are not limiting. Indeed, the device for generating vertical force 10 described herein may be used in other applications outside of the rail industry. For example, the device may be used to test the integrity of any structure that receives downward acting force. Still further, alternative shapes of the housing 12 are contemplated as falling within the scope of the present disclosure. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A device for generating vertical force, comprising:
a housing;
at least one bearing sleeve mounted in the housing; and
at least one mass sleeve mounted within the bearing sleeve, the mass sleeve having a first mass and a second mass coupled thereto, the first mass being larger than the second mass and being positioned substantially 180 degrees from the second mass, wherein
the first mass is coupled to a mass shaft, and
the mass shaft is slidably coupled to an eccentric drive shaft.

2. A device according to claim 1, wherein the housing is disposed on a rail vehicle.

3. A device according to claim 2, wherein the rail vehicle is a drone vehicle.

4. A device according to claim 1, wherein the first and second masses extend along a longitudinal length of the mass sleeve.

5. A device according to claim 1, wherein the at least one mass sleeve comprises four mass sleeves.

6. A device for generating vertical force, comprising:
a housing;
at least one bearing sleeve mounted in the housing; and
at least one mass sleeve mounted within the bearing sleeve, the mass sleeve having a first mass and a second mass coupled thereto, the first mass being larger than the second mass and being positioned substantially 180 degrees from the second mass, wherein
the first mass is coupled to a mass shaft, and
the first mass includes a pair of slots formed therein.

7. A device according to claim 6, wherein the housing is disposed on a rail vehicle.

8. A device according to claim 7, wherein the rail vehicle is a drone vehicle.

9. A device according to claim 6, wherein the first and second masses extend along a longitudinal length of the mass sleeve.

10. A device according to claim 6, wherein the at least one mass sleeve comprises four mass sleeves.

11. A method for generating downward forces, comprising:
providing a device having first and second mass sleeves mounted within a housing and a coupled to a drive shaft, wherein each mass sleeve comprises a first mass and a second mass coupled thereto;
rotating the drive shaft to effect rotation of the mass sleeves such that the first and second masses increase in rotational speed as they rotate away from a drive shaft and decrease in rotational speed as they rotate towards the drive shaft, wherein
the first mass sleeve is coupled to the drive shaft via a pair of shafts, and further wherein rotating the drive shaft causes translation of the shafts through the drive shaft.

12. A method according to claim 11, further comprising rotating the mass sleeves in opposite directions and in such a way that the first masses are in a downward position at substantially the same time.

13. A method according to claim 12, further comprising rotating the mass sleeves to cancel lateral forces generated by rotation of the mass sleeves.

14. A method according to claim 11, wherein the pair of shafts are coupled to the first mass and are adapted to pivot relative to the first mass during rotation.

15. A drone rail vehicle, comprising:
a frame;
a track stabilization unit coupled to the frame, the track stabilization unit having a device for generating vertical force comprising:
at least one bearing sleeve mounted in the housing; and
at least one mass sleeve mounted within the bearing sleeve, the mass sleeve having a first mass and a second mass coupled thereto, the first mass being larger than the second mass and being positioned substantially 180 degrees from the second mass, wherein
the first mass is coupled to a mass shaft, and
the mass shaft is slidably coupled to an eccentric drive shaft.

16. A drone rail vehicle according to claim 15, wherein the first and second masses extend along a longitudinal length of the mass sleeve.

17. A drone rail vehicle according to claim 15, wherein the at least one mass sleeve comprises four mass sleeves.

18. A drone rail vehicle, comprising:
a frame;
a track stabilization unit coupled to the frame, the track stabilization unit having a device for generating vertical force comprising:
at least one bearing sleeve mounted in the housing; and
at least one mass sleeve mounted within the bearing sleeve, the mass sleeve having a first mass and a second mass coupled thereto, the first mass being larger than the second mass and being positioned substantially 180 degrees from the second mass, wherein
the first mass includes a pair of slots formed therein.

19. A drone rail vehicle according to claim 18, wherein the first mass is coupled to a mass shaft.

20. A drone rail vehicle according to claim 18, wherein the first and second masses extend along a longitudinal length of the mass sleeve.

21. A drone rail vehicle according to claim 18, wherein the at least one mass sleeve comprises four mass sleeves.

22. A method for varying the ratio of an upward and downward, comprising:
providing a device for generating vertical force, the device having:
at least one bearing sleeve mounted in a housing;
at least one mass sleeve mounted within the bearing sleeve, the mass sleeve having a first mass and a second mass coupled thereto, the first mass being larger than the second mass and being positioned substantially 180 degrees from the second mass; and
a gear box disposed adjacent to the mass sleeve; and
varying an offset between a centerline of the gear box and a centerline of the mass sleeve.

* * * * *